US011055868B2

(12) United States Patent
Shea et al.

(10) Patent No.: US 11,055,868 B2
(45) Date of Patent: Jul. 6, 2021

(54) SYSTEMS AND METHODS FOR SIZING OBJECTS VIA A COMPUTING DEVICE

(71) Applicant: Radius Technologies, LLC, Kennesaw, GA (US)

(72) Inventors: John David Shea, Atlanta, GA (US); Thomas Maurice Dantin, Jr., Ponte Vedra Beach, FL (US)

(73) Assignee: Radius Technologies, LLC, Kennesaw, GA (US)

( * ) Notice: Subject to any disclaimer, the term of this patent is extended or adjusted under 35 U.S.C. 154(b) by 91 days.

(21) Appl. No.: 16/505,211

(22) Filed: Jul. 8, 2019

(65) Prior Publication Data

US 2020/0027232 A1    Jan. 23, 2020

Related U.S. Application Data

(60) Provisional application No. 62/700,469, filed on Jul. 19, 2018.

(51) Int. Cl.
| | |
|---|---|
| *G06K 9/00* | (2006.01) |
| *G06T 7/62* | (2017.01) |
| *G06T 7/00* | (2017.01) |
| *G06F 3/0482* | (2013.01) |
| *G06Q 30/06* | (2012.01) |
| *G06F 3/0484* | (2013.01) |

(52) U.S. Cl.
CPC .............. *G06T 7/62* (2017.01); *G06F 3/0482* (2013.01); *G06F 3/04845* (2013.01); *G06Q 30/0621* (2013.01); *G06T 7/0002* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 3,548,506 A * | 12/1970 | Harrington | G01B 3/34 33/555.2 |
| 8,649,575 B2 | 2/2014 | Nagar et al. | |
| 9,311,825 B2 | 4/2016 | Lusted et al. | |
| 9,329,717 B2 | 5/2016 | Westerman et al. | |
| 9,696,897 B2 | 7/2017 | Garcia | |
| 9,928,413 B2 | 3/2018 | Baca et al. | |
| 9,965,159 B2 | 5/2018 | Knodt | |
| 2007/0226656 A1* | 9/2007 | Zwart | G06F 3/0481 715/856 |
| 2011/0307349 A1 | 12/2011 | Gandhi et al. | |
| 2012/0224052 A1 | 9/2012 | Bae | |
| 2017/0083230 A1* | 3/2017 | Reddy | G06F 3/005 |
| 2017/0193699 A1* | 7/2017 | Mehr | G06F 17/10 |
| 2019/0005672 A1* | 1/2019 | McLear | G06T 7/62 |
| 2019/0043188 A1* | 2/2019 | Wang | G06T 7/521 |
| 2019/0228448 A1* | 7/2019 | Bleicher | G06Q 30/0621 |

\* cited by examiner

*Primary Examiner* — Wei Wen Yang
(74) *Attorney, Agent, or Firm* — Morris, Manning & Martin, LLP; Daniel E. Sineway, Esq.

(57) ABSTRACT

The present disclosure generally relates to the measurement of objects. Using unique processes, the present systems and methods can determine the size of an object using a computing device. For example, in certain embodiments, the present systems and methods receive a physical object such as a finger, determine the size of the finger in pixels, and convert the size of the finger in pixels into a ring size.

21 Claims, 10 Drawing Sheets

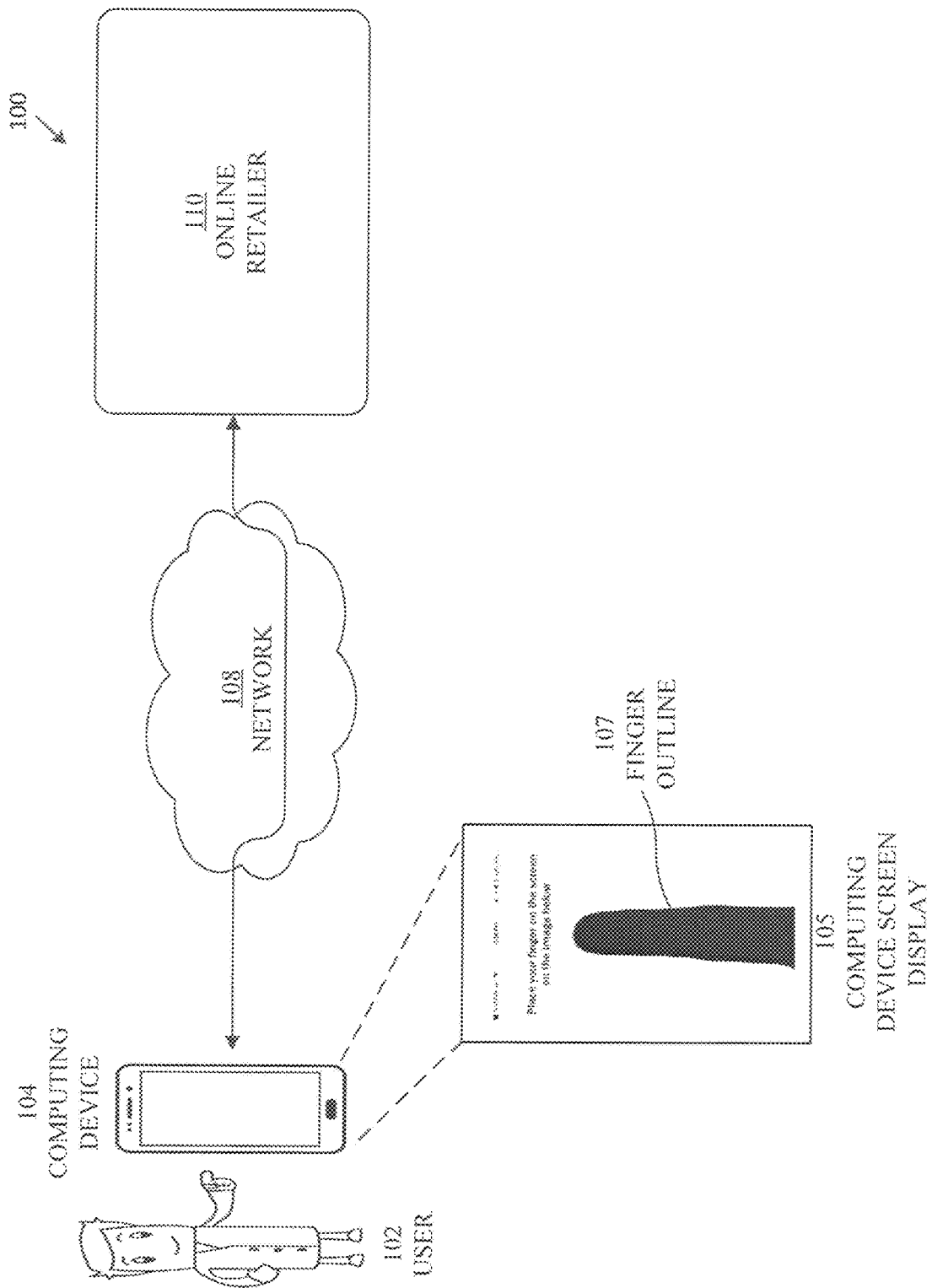

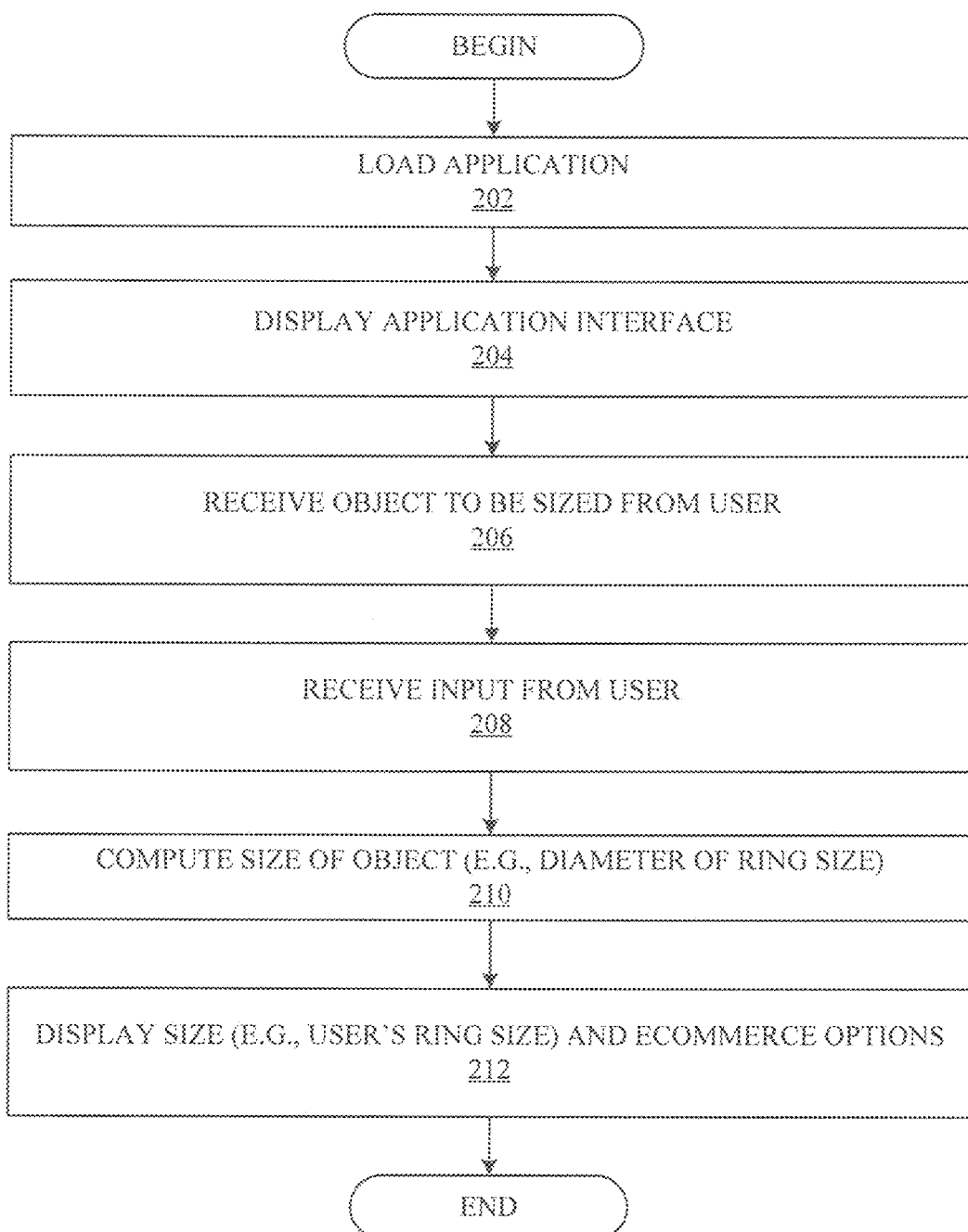
FIG. 2: EXEMPLARY FINGER SIZING PROCESS

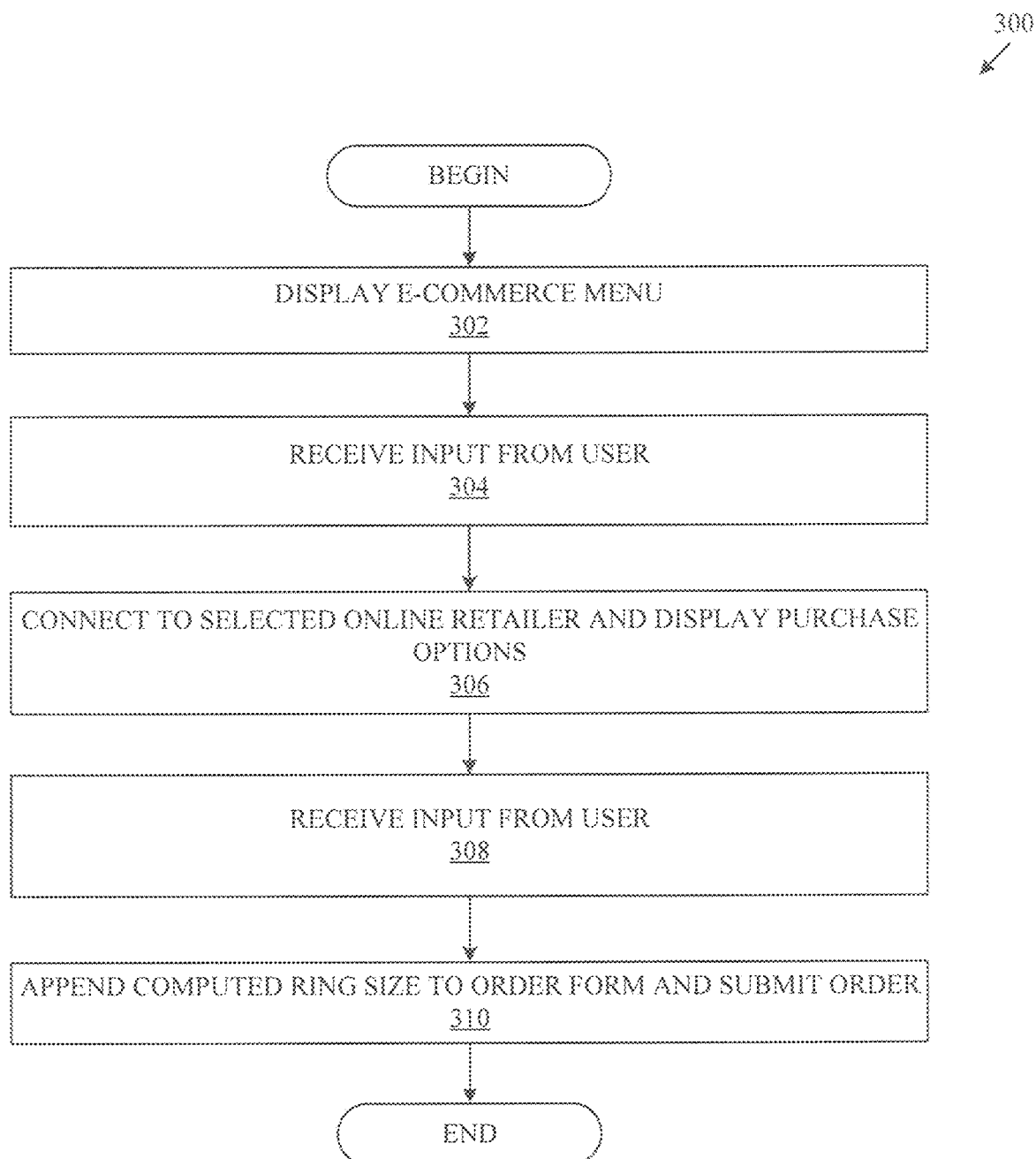
FIG. 3: EXEMPLARY E-COMMERCE RING PURCHASING PROCESS

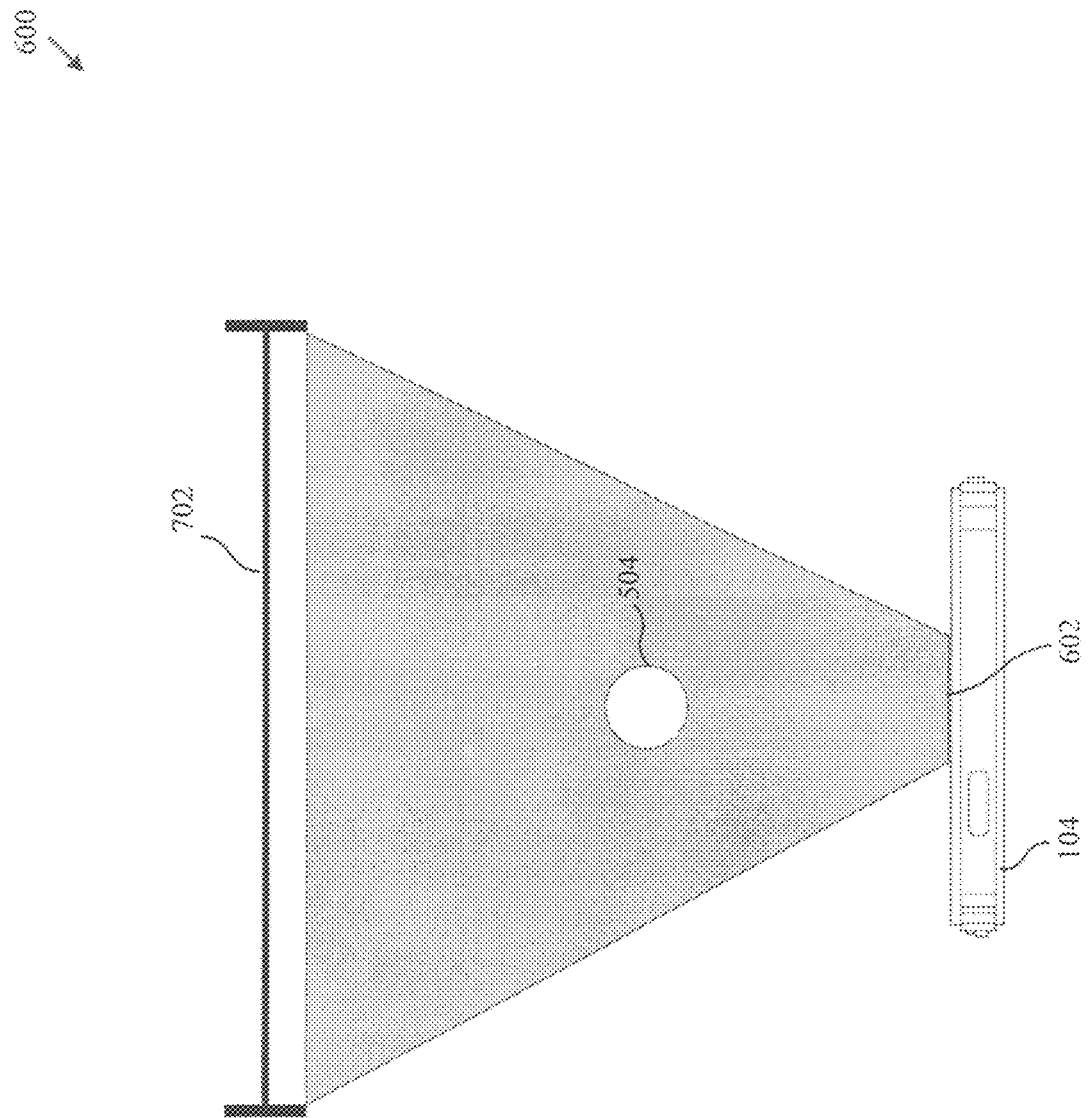

SYSTEMS AND METHODS FOR SIZING OBJECTS VIA A COMPUTING DEVICE

CROSS REFERENCE TO RELATED APPLICATIONS

This application claims priority to, the benefit under 35 U.S.C. § 119 of, and incorporates by reference herein in its entirety U.S. Provisional Patent Application No. 62/700,469, filed Jul. 19, 2018, and entitled "SYSTEMS AND METHODS FOR SIZING OBJECTS VIA A COMPUTING DEVICE."

TECHNICAL FIELD

The present systems and methods relate generally to measurement of objects, and more particularly to systems and methods for the measurement of physical objects, such as fingers or other anatomical objects, via a computer display interface.

BACKGROUND

Measurements are not only important in science, design, and engineering industries, but everyday tasks often require measurements as well. From calculating distance on a map, to obtaining product dimensions, to measuring necklaces, bracelets, rings, and other pieces of jewelry, having ready access to a measuring device can prove useful in a variety of contexts.

For example, each year, millions of graduating students engage in the process of purchasing class rings as a symbolic representation of their achievement. As a requisite step to purchasing a class ring, each student must obtain a ring size based on the measurement of his or her finger. Generally, the ring sizing process involves a student's physical presence in a store, or employs a physical sizing chart, such that the results can be relayed to a ring retailer upon taking additional measures (e.g., emailing the results, telephoning the results, entering the results into a customer portal on the Internet, etc.).

As society moves into an era where instant gratification is becoming an expectation, not only is there a general lack of immediate access to measuring devices, but the ring sizing process specifically has become severely antiquated in its implementation. The requirement of a person's physical presence to accomplish an intermediary task is a scarcity, and the ring sizing process is one of the few retail mechanisms that maintain this requirement. Therefore, there is a long-felt but unresolved need for a system or method that can expeditiously and accurately measure a physical object, such as a ring finger, without the need for antiquated measuring equipment or an in-store or on-location experience.

BRIEF SUMMARY OF DISCLOSURE

Briefly described, and according to one embodiment, aspects of the present disclosure generally relate to sizing objects virtually. In one embodiment, the present systems and methods allow for a user to obtain the measurement of an object that is capable of being rested on the screen display of a computing device (e.g., a pencil, a watch band, a bolt, etc.). In one embodiment, the object for measurement may be a user's finger for the purpose of generating a ring size. Traditionally, ring sizes are obtained by placing a physical device around a finger, such that a measurement can be ascertained and correlated to a ring size. In these traditional embodiments, the physical device generally provides limited additional functionality apart from determining ring size. Furthermore, in the event a user forgets or misplaces his or her ring size, the user will generally have to commute to a retail establishment to have his or her finger re-sized by the physical ring-sizing device. Additionally, alternate methods of obtaining a ring size are inaccurate (e.g., tying a string around a finger, enclosing a finger with a piece of tape, etc.). According to various aspects of the present disclosure, the present system and methods eliminate the need for an in-person measurement of an object (e.g., finger) thus obviating the friction and inconvenience of a user having to travel to a physical location to obtain the measurement.

In various embodiments, the present systems and methods include a computing device operable to display graphical information. In one or more embodiments, the computing device may include tablet computers (e.g., iPads®), smartphones, desktop computers, or any appropriate device capable of displaying visual information on a screen and receiving user input. In particular embodiments, the systems and methods disclosed herein may include software executed on the computing device to facilitate ring-size generation.

In one embodiment, the computing device and the software interact to generate and display a standardized profile of an object outline (or silhouette) to facilitate object measurement. In certain embodiments, the standardized profile of an object outline may be displayed on a wall or other flat surface using a projection mechanism. In particular embodiments, the object outline may be a finger outline to facilitate ring size generation. In particular embodiments, the silhouette or the standardized finger outline may be resized to visually match the dimensions of a user's actual finger as placed on the computing device screen display. In various embodiments, the size of the standardized finger outline after resizing to match the size of the user's actual finger may be used to compute the user's ring size.

In another embodiment, the camera of the computing device may be used to compute the object measurement (e.g., user's ring size). In particular embodiments an image of the object is captured using the camera, whereby the size of the object may be generated using the captured image.

In particular embodiments, object measurement may be facilitated using sensor technology. In one embodiment, sensor technology is used to scan the object such that a three-dimensional map of the object may be created, and the size of the object (e.g., finger) is generated using the three-dimensional rendering. In another embodiment, heat sensors are used to generate a screen imprint of the object to be measured, such that the object size may be determined from the screen imprint. In yet another embodiment, an object outline is generated using light sensors. In these embodiments (and others), the object outline (or silhouette) is used to facilitate the object measurement.

According to a particular embodiment, the present systems and methods include an operable connection to online retailers. In various embodiments, the online retailers may include any retailer that partakes in the sale of rings. In some embodiments, the present systems and methods may automatically populate an online retailer's order form with a user's computed ring size to expedite a ring ordering process.

According to particular embodiments, the present disclosure generally describes a method for automatically sizing a physical object via an electronic computing device, including the steps of: displaying a silhouette of an anticipated physical object on a graphical user interface (GUI) of the electronic computing device; receiving input at the electronic computing device corresponding to the silhouette, wherein the input results in a display of an updated silhouette of the anticipated physical object such that the updated silhouette substantially matches the physical object, the updated silhouette having a pixel dimension; retrieving a pixel ratio corresponding to the GUI of the electronic computing device; and calculating an attribute of the physical object based on the pixel dimension and the pixel ratio.

In particular embodiments, the present disclosure describes the method herein, wherein the input includes user interaction with the GUI to increase or decrease the size of the silhouette. In one or more embodiments, aspects of the present disclosure generally describe the method herein, wherein the input includes instructions to modify a size or shape of the silhouette. In some embodiments, the present disclosure describes the method herein, wherein the input includes voice commands or gestures. Generally, in at least one embodiment, the present disclosure describes the method herein, wherein the pixel ratio includes the number of pixels per inch of the GUI. In particular embodiments, the present disclosure describes the method herein, wherein the attribute includes a diameter of the physical object. In various embodiments, aspects of the present disclosure generally describe the method herein, wherein the physical object includes a human finger. In one or more embodiments, the present disclosure describes the method herein, wherein the attribute includes a width of the human finger. In certain embodiments, the present disclosure describes the method herein, further including the step of determining a ring size of the human finger by comparing the width of the human finger to a known table of ring sizes affiliated with diameter ranges. In at least one embodiment, the present disclosure describes the method herein, further including the steps of: initiating a connection to an e-commerce platform; transmitting the ring size via the connection to the e-commerce platform; and initiating an order of a ring based on the ring size.

According to various embodiments, the present disclosure generally describes a system for automatically sizing a physical object, including: a database that stores pixel ratios for electronic computing devices; and an electronic computing device in operative communication with the database, the electronic computing device having a processor operative to: display a silhouette of an anticipated physical object on a graphical user interface (GUI) of the electronic computing device; receive input at the electronic computing device corresponding to the silhouette, wherein the input results in a display of an updated silhouette of the anticipated physical object such that the updated silhouette substantially matches the physical object, the updated silhouette having a pixel dimension; retrieve a pixel ratio corresponding to the GUI of the electronic computing device from the database; and calculate an attribute of the physical object based on the pixel dimension and the pixel ratio.

In particular embodiments, the present disclosure describes the system herein, wherein the input includes user interaction with the GUI to increase or decrease the size of the silhouette. Aspects of the present disclosure generally describe the system herein, wherein the input includes instructions to modify a size or shape of the silhouette. In at least one embodiment, the present disclosure describes the system herein, wherein the input includes voice commands or gestures. In certain embodiments, the present disclosure describes the system herein, wherein the pixel ratio includes the number of pixels per inch of the GUI. Generally, in at least one embodiment, the present disclosure describes the system herein, wherein the attribute includes a diameter of the physical object. In various embodiments, the present disclosure describes the system herein, wherein the physical object includes a human finger. In one or more embodiments, the present disclosure describes the system herein, wherein the attribute includes a width of the human finger. In some embodiments, the present disclosure describes the system herein, wherein the processor is further operative to determine a ring size of the human finger by comparing the width of the human finger to a known table of ring sizes affiliated with diameter ranges. In at least one embodiment, the present disclosure describes the system herein, wherein the processor is further operative to: initiate a connection to an e-commerce platform; transmit the ring size via the connection to the e-commerce platform; and initiate an order of a ring based on the ring size.

According to various embodiments, the present disclosure generally describes a mobile device for automatically sizing a physical object, including: a processor operable on the mobile device, the processor operative to: display a silhouette of an anticipated physical object on a graphical user interface (GUI) of the mobile device; receive input at the mobile device corresponding to the silhouette, wherein the input results in a display of an updated silhouette of the anticipated physical object such that the updated silhouette substantially matches the physical object, the updated silhouette having a pixel dimension; retrieve a pixel ratio corresponding to the GUI of the mobile device; and calculate an attribute of the physical object based on the pixel dimension and the pixel ratio.

These and other aspects, features, and benefits of the claimed system will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system environment, according to one embodiment of the present disclosure.

FIG. 2 illustrates an exemplary flowchart of an exemplary finger sizing process, according to one embodiment of the present disclosure.

FIG. 3 illustrates an exemplary flowchart of an exemplary e-commerce ring purchasing process, according to one embodiment of the present disclosure.

FIG. 7 illustrates an exemplary use case scenario, according to one embodiment of the present disclosure.

DETAILED DESCRIPTION

Figure 4A:
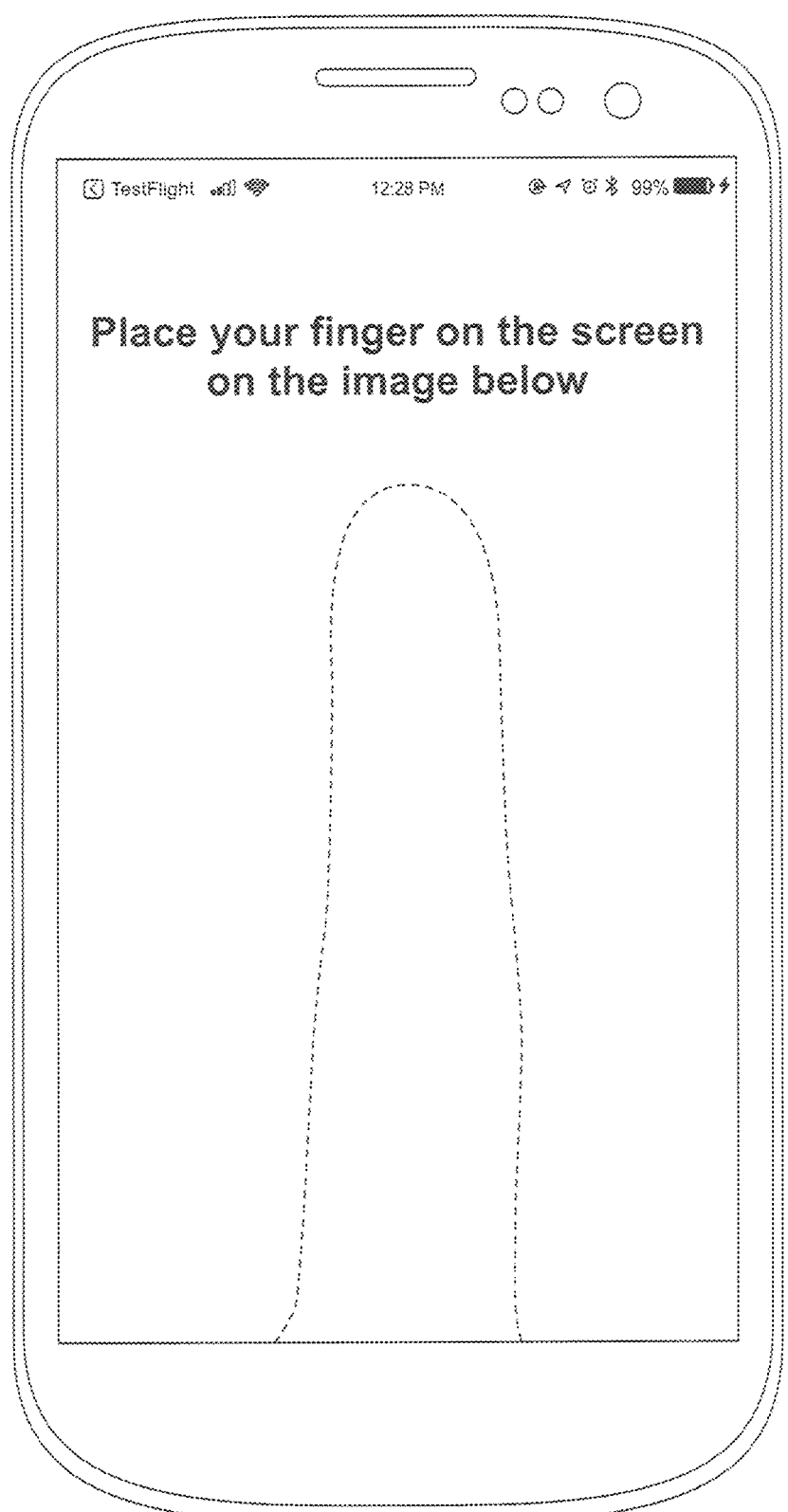
FIG. 4 (including FIGS. 4A-4D) illustrates exemplary screen displays of an exemplary finger sizing process, according to one embodiment of the present disclosure.
Figure 4B:
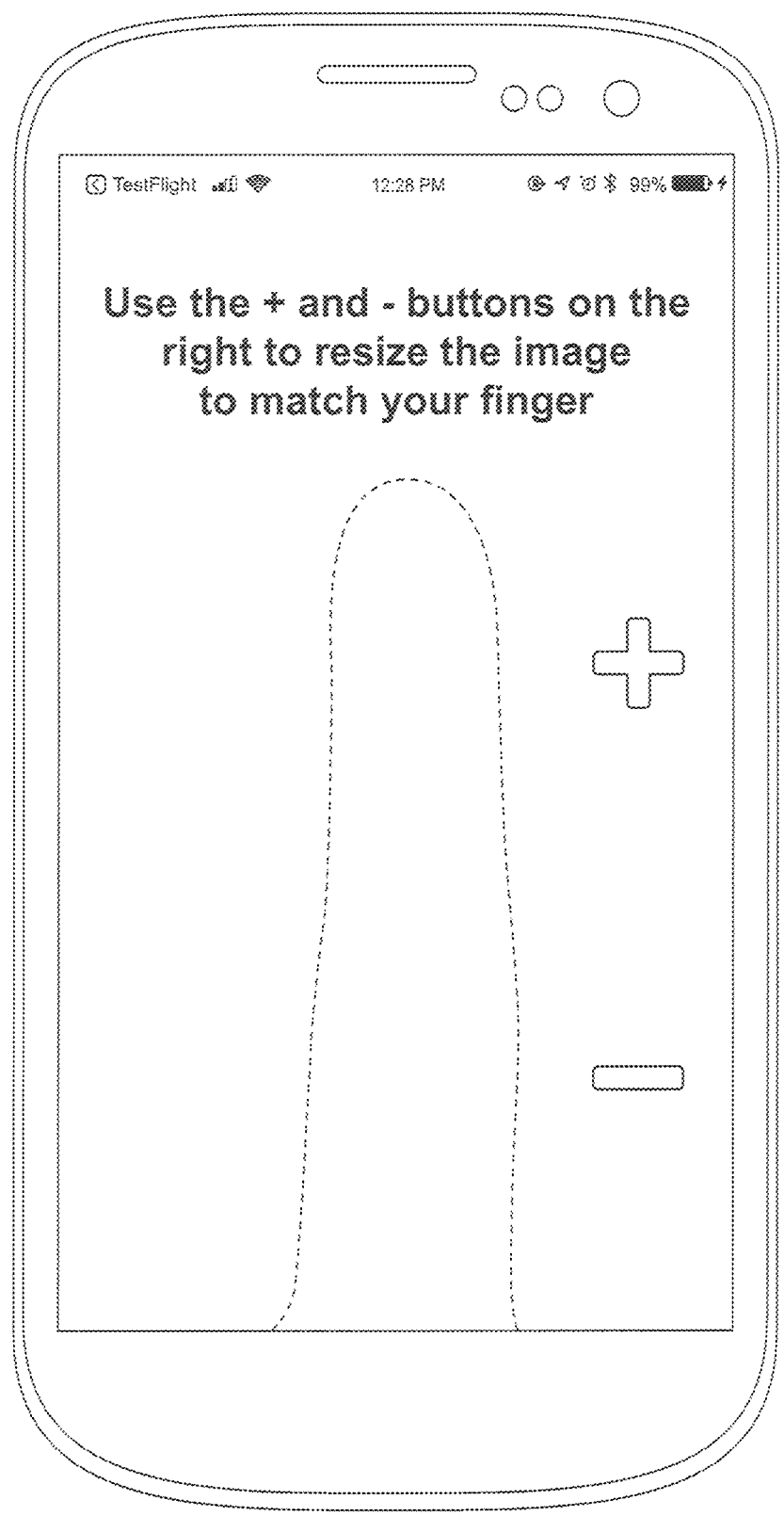
Figure 4C:
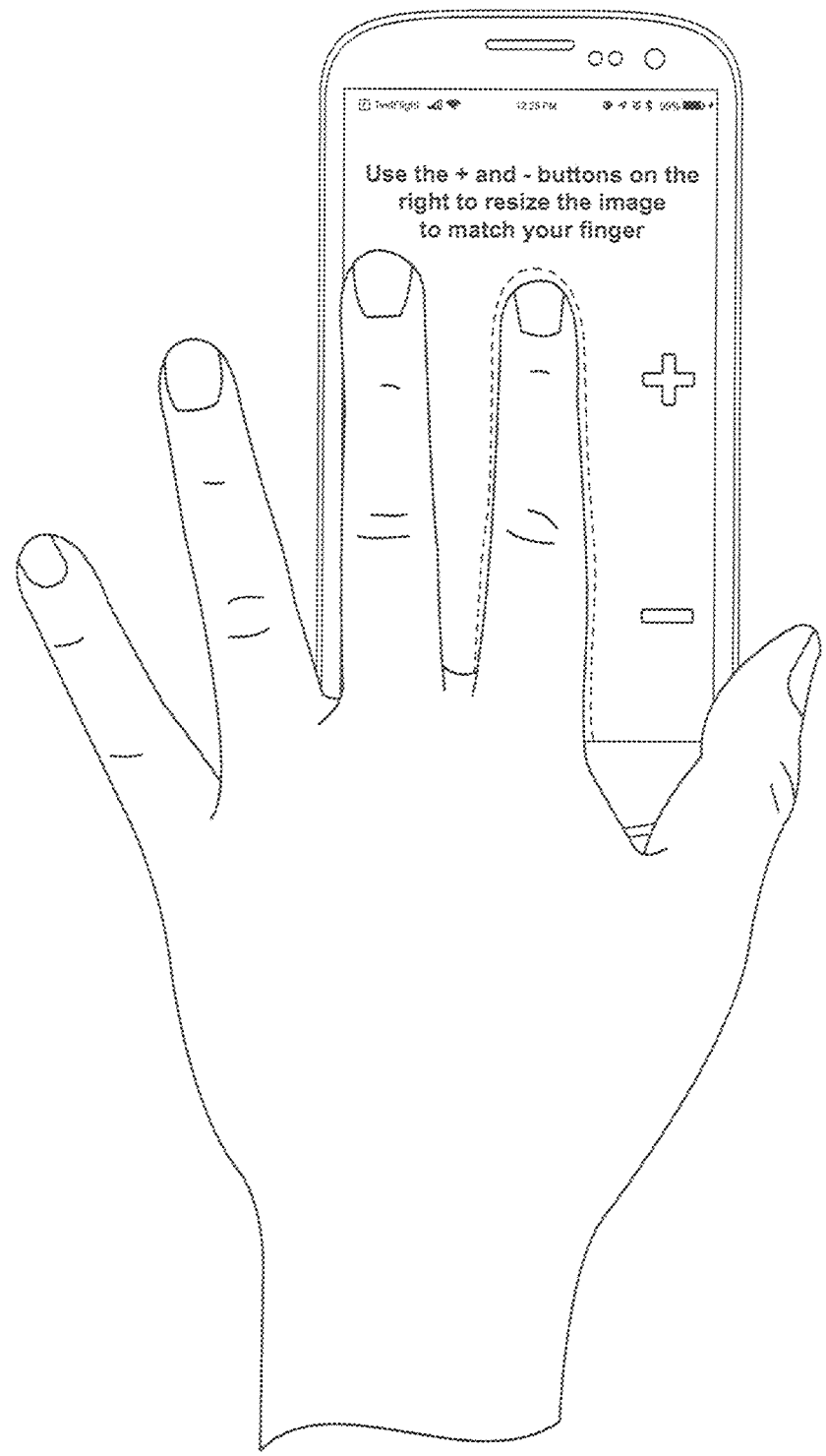
Figure 4D:

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

According to various aspects of the present disclosure, and in one embodiment, the present systems and methods allow for a user to obtain the measurement of an object that is capable of being rested on the screen display of a computing device (e.g., a pencil, a watch band, a bolt, etc.). In one embodiment, the object for measurement may be a user's finger for the purpose of generating a ring size. Traditionally, ring sizes are obtained by placing a physical device around a finger, such that a measurement can be ascertained and correlated to a ring size. In these traditional embodiments, the physical device generally provides limited additional functionality apart from determining ring size. Furthermore, in the event a user forgets or misplaces his or her ring size, the user will generally have to commute to a retail establishment to have his or her finger re-sized by the physical ring-sizing device. Additionally, alternate methods of obtaining a ring size are inaccurate (e.g., tying a string around a finger, enclosing a finger with a piece of tape, etc.). According to various aspects of the present disclosure, the present system and methods eliminate the need for an in-person measurement of an object (e.g., finger) thus obviating the friction and inconvenience of a user having to travel to a physical location to obtain the measurement.

In various embodiments, the present systems and methods include a computing device operable to display graphical information. In one or more embodiments, the computing device may include tablet computers (e.g., iPads®), smartphones, desktop computers, or any appropriate device capable of displaying visual information on a screen and receiving user input. In particular embodiments, the systems and methods disclosed herein may include software executed on the computing device to facilitate ring-size generation.

In one embodiment, the computing device and the software interact to generate and display a standardized profile of an object outline (or silhouette) to facilitate object measurement. In certain embodiments, the standardized profile of an object outline may be displayed on a wall or other flat surface using a projection mechanism. In particular embodiments, the object outline may be a finger outline to facilitate ring size generation. In particular embodiments, the silhouette or the standardized finger outline may be resized to visually match the dimensions of a user's actual finger as placed on the computing device screen display. In various embodiments, the size of the standardized finger outline after resizing to match the size of the user's actual finger may be used to compute the user's ring size.

In another embodiment, the camera of the computing device may be used to compute the object measurement (e.g., user's ring size). In particular embodiments an image of the object is captured using the camera, whereby the size of the object may be generated using the captured image.

In particular embodiments, object measurement may be facilitated using sensor technology. In one embodiment, sensor technology is used to scan the object such that a three-dimensional map of the object may be created, and the size of the object (e.g., finger) is generated using the three-dimensional rendering. In another embodiment, heat sensors are used to generate a screen imprint of the object to be measured, such that the object size may be determined from the screen imprint. In yet another embodiment, an object outline is generated using light sensors. In these embodiments (and others), the object outline (or silhouette) is used to facilitate the object measurement.

According to a particular embodiment, the present systems and methods include an operable connection to online retailers. In various embodiments, the online retailers may include any retailer that partakes in the sale of rings. In some embodiments, the present systems and methods may automatically populate an online retailer's order form with a user's computed ring size to expedite a ring ordering process.

Exemplary Embodiments

Referring now to the figures, for the purposes of example and explanation of the fundamental processes and components of the disclosed systems and methods, reference is made to FIG. 1, which illustrates an exemplary, high-level overview 100 of one embodiment of the systems and methods herein. As will be understood and appreciated, the exemplary, high-level overview 100 shown in FIG. 1 represents merely one approach or embodiment of the present system, and other aspects are used according to various embodiments of the present system. In particular, FIG. 1 depicts a particular example in which a user 102 seeks to obtain the ring size of one of his or her fingers, and purchase a ring from an online retailer 110 by using an application on his or her computing device 104. Further, FIG. 1 depicts how various systems in this environment interact in at least one embodiment of the systems and methods described herein.

As shown in FIG. 1, a user 102 accesses a computing device 104 for the purpose of obtaining the ring size of one of his or her fingers, whereby he or she may purchase a ring from an online retailer 110 (e.g., jeweler, department store, etc.). In some embodiments, the user may access the computing device to obtain the measurement of, and place an order for, a variety of objects (e.g., a bracelet, a toy, a marker, etc.). In various embodiments, the computing device may be a tablet computer (e.g., iPad), smartphone, desktop computer, or other like device. In one or more embodiments, the computing device is operatively connected to the online retailer via one or more networks 108.

In one embodiment, the network 108 may be, but is not limited to the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hosts, etc. are typically involved in these communications.

Although not shown in FIG. 1, such communications may include, in various embodiments, one or more secure networks, gateways, or firewalls that provide additional security from unwarranted intrusions by unauthorized third parties and cyber-attacks.

Assume, as a discussion example, that the user 102 is a graduating high school senior and is in the market for a senior class ring to be placed on the ring finger of his right hand. Rather than travel to a local jewelry store, the user seeks to make his purchase online from an online retailer 110. As such, the user engages his mobile phone (e.g., computing device 104) and executes a finger-sizing application ("application") (the application may be web-based, native, hybrid, etc.). Following the instructions of the application, as shown on his screen display 105, the user selects his desired hand and finger to be sized, then places his respective ring finger on the mobile phone screen display, such that it is on or within the finger outline (or silhouette) 107 displayed on the screen. With his opposite hand, the user 102 then presses plus and/or minus buttons located on the screen display 105, to resize the finger outline until it matches an attribute (e.g., the width) of his ring finger. Next, the user presses the "Calculate" button, and the ring size of his ring finger will be calculated and displayed on the screen of his mobile phone (e.g., computing device 104).

Continuing with the present example, once the user's 102 ring size has been generated, the user may press a "Shop for Rings Now" button, and is subsequently prompted to select a type of ring. The user then selects "Class Rings" from a list of available options, and an aggregated list of class rings from all participating retailers is displayed (a participating retailer is a retailer that has agreed to allow the application access to its inventory). The user chooses his desired ring, and the application automatically populates his ring size in the order form. The user then completes the outstanding information in the order form (e.g., name, address, telephone number, payment information, etc.) and clicks on the "Purchase" button to complete his order.

As will be understood from the discussions herein, the above particular example is merely exemplary functionality of the systems and methods described herein. For example, the above describes a user obtaining the ring size of his right ring finger for the purposes of obtaining a class ring, but the systems and methods herein may be useful for any use in connection with measuring an object by placing the object on the screen of a computing device 104. Alternate examples may include a user seeking to obtain the size of a necklace for the purposes of ordering another necklace of the same size; or a user desiring to obtain the measurements of his or her hand for the purposes of ordering winter gloves; or even a user seeking to measure the inner diameter of a baseball cap for the purposes of determining his or her hat size. The above mentioned alternate examples are merely exemplary functionality and are not meant to limit the scope of this disclosure.

Turning now to FIG. 2, an exemplary flowchart of an exemplary finger-sizing process 200 is shown, according to one embodiment of the present disclosure. In particular embodiments, a user that may not know his or her ring size but is seeking to purchase a ring may initiate the exemplary finger-sizing process. As will be understood by a person having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

In one embodiment, and as shown in FIG. 2, the exemplary process 200 begins with step 202, where the system is configured to load the application (the application may be web-based, native, hybrid, etc.). In various embodiments, the application may load upon receiving a user initiated command requesting that the application load. In one or more embodiments, the application may load automatically when a user is engaged in the ring purchasing process and is prompted to enter a ring size on an order form.

At step 204, the system displays an application interface. In particular embodiments, the application interface may include an object, e.g., finger outline (or silhouette) to serve as a guideline for a user's finger or other object to be measured. In various embodiments, the finger outline may initially appear with a predetermined pixel width (e.g., 100 pixels, 150 pixels, 250 pixels, etc.). In some embodiments, plus and minus buttons, or any other suitable sizing mechanism (e.g., sliders, voice commands, etc.) may be included in the application interface whereby a user can increase or decrease the width of the finger outline (or silhouette) by one pixel at a time. In one or more embodiments, the application interface may include object measurement options that can alter the appearance of the finger outline displayed (e.g., hand selection options, finger selection options, etc.). In various embodiments, the application interface may include a button (e.g., "calculate," "submit," "done," etc.) that a user can press to calculate and display his or her ring size.

Turning now to step 206, the system receives an object to be sized from a user. In particular embodiments, the object is received when a user places it on top of the screen displaying the application interface, such that the object is on or within the object, e.g., finger outline. In one or more embodiments, the object may be received by any suitable method (e.g., hovered over the screen, repeatedly placed and removed from the screen such that the object outline can be adjusted between placements, etc.). In one embodiment, the object received may be a user's finger. In various embodiments, the object received may be any suitable object that can fit within the screen displaying the application interface.

At step 208, the system receives input from a user. In various embodiments, the system may be configured to receive touch input, mouse clicks, or any other suitable form of user input. In particular embodiments, the input received may increase or decrease the width of the finger outline (or silhouette) until the finger outline matches an attribute (e.g., the width) of the user's finger. In these embodiments, if the user touches or clicks on the plus and/or minus buttons on the application interface, the finger outline will increase or decrease by one pixel per user touch/click (e.g., if the predetermined pixel width of the finger outline is 200 pixels, and the user touches the plus button seven times and the minus button three times, the pixel width of the finger outline will increase by seven and then decrease by three, such that the resulting pixel width (i.e., pixel dimension) of the finger outline would be 204 pixels). In one or more embodiments, the input received may indicate a request to generate a ring size.

At step 210, the system is configured to compute a user's ring size using the following formula:

$$\text{Inside Diameter of Ring} = \frac{\text{(resulting pixel width)}}{\text{(pixels per inch of screen display)}} \times 25.4$$

In particular embodiments, the system may compute a user's ring size based on the resulting pixel width of the finger outline (or silhouette) generated in step 208. In one or more embodiments, the resulting pixel width (i.e., pixel dimension) may be generated by a pixel counter or other suitable mechanism. In various embodiments, the resulting pixel width of the finger outline equates to the inside diameter of the user's ring. Initially, in one or more embodiments, the inside diameter of the user's ring (in inches) may be determined by dividing the resulting pixel width of the finger outline by pixel ratio, i.e., the number of pixels per inch ("ppi") on a user's screen (a known specification of a mobile device). In various embodiments, the quotient is then multiplied by 25.4 to convert the inside diameter of the user's ring from inches to millimeters. For example, a finger outline having a resulting pixel width (i.e., pixel dimension) of 204 pixels on a computing device having a pixel ratio of 350 ppi would equate to a ring having an inside diameter of 14.51 mm (204±350×25.4). The inside diameter would then be compared to a ring-size conversion chart to compute the user's ring size. As would be understood by a person having ordinary skill in the art, inside diameter measurements convert to different ring sizes based on country specifications. An example of a ring-size conversion chart in the United States and Canada is as follows:

| Inside Diameter (mm) | Ring Size |
| --- | --- |
| 14.1 | 3 |
| 14.5 | 3.5 |
| 14.9 | 4 |
| 15.3 | 4.5 |
| 15.7 | 5 |
| 16.1 | 5.5 |
| 16.5 | 6 |
| 16.9 | 6.5 |
| 17.3 | 7 |
| 17.7 | 7.5 |
| 18.1 | 8 |
| 18.5 | 8.5 |
| 18.9 | 9 |

In the above example, the user would have a ring size of 3.5 in the United States and Canada.

At step 212, the system is configured to display the user's ring size via the application interface. In various embodiments, the system may also display a button that enables e-commerce options for ring shopping.

Referring now to FIG. 3, an exemplary flowchart of an exemplary e-commerce ring purchasing process 300 is shown, according to one embodiment of the present disclosure. In various embodiments, the exemplary process 300 begins with step 302, in which the system displays an e-commerce menu. In particular embodiments, the e-commerce menu provides users with search options for facilitating a ring purchase (e.g., type of ring, type of band, preferred stone, preferred metal, gender of ring-wearer, etc.).

At step 304, the system is configured to receive input from the user. In various embodiments, the system may receive touch input, mouse clicks, or any other suitable form of user input. In one or more embodiments, the input received corresponds to user selections from the e-commerce menu (e.g., a user may select a white gold wedding band with diamond stones for a female). In particular embodiments, input received may indicate a user's request to begin a ring search.

At step 306, the system is configured to connect to online retailers and display purchase options. In various embodiments, the system may search the online retailers for rings that match the user's preferences based on the user selections made at step 304. In particular embodiments, the system may connect to, and display purchase options from any online retailer that sells rings via an e-commerce platform.

Next, at step 308, the system receives input from the user. In particular embodiments, the system may receive touch input, mouse clicks, or any other suitable form of user input. In some embodiments, the input received indicates the user's desired selection from the list of available purchase options displayed at step 306. Upon receiving a user's desired selection, at step 310, the system is configured to append the user's computed ring size to the online retailer's order form, and submit the order for the user's desired selection.

Turning now to FIG. 4 (including FIGS. 4A-4D), exemplary screen displays of an exemplary object (e.g., finger) sizing process are shown, according to one embodiment of the present disclosure. Generally, FIG. 4A shows one embodiment of the initial application interface that includes the finger outline (or silhouette) 107 and instructions for the user 102 to place his or her finger on the screen display 105 on or within the finger outline. FIG. 4B includes a screen display of the application interface after a user places his or her finger on the finger outline 107, whereby the user is instructed how to resize the finger outline (or silhouette) to match his or her finger. FIG. 4C shows an exemplary screen display that includes a user's hand engaging with the application interface. Finally, FIG. 4D shows an exemplary screen display of the application interface that includes a display of a user's calculated ring size.

Alternate Embodiments

Alternative embodiments of the system may include features that are, in some respects, similar to the various methods described above. In particular, a variety of object sizing systems and methods using a computing device (e.g., smartphone, tablet, etc.) are contemplated by this disclosure.

Figure 5:
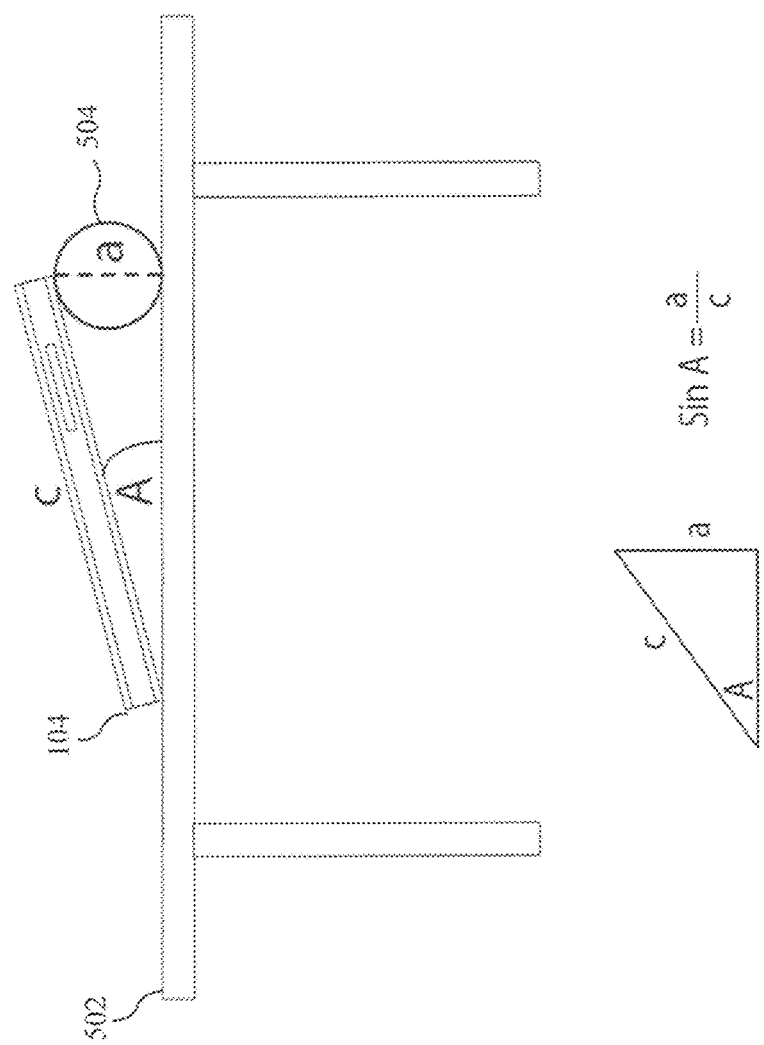
FIG. 5 illustrates an exemplary system environment, according to one embodiment of the present disclosure.

FIG. 5 shows an exemplary system environment 500, according to one embodiment of the present disclosure. In various embodiments, the combination of using the accelerometer and gyroscope in a computing device 104 (e.g., smartphone) may be used to facilitate object measurement. In particular embodiments, an object 504 (e.g., a finger) may be placed on a flat surface 502 underneath a computing device 104 operable to detect angle variations using an accelerometer and/or a gyroscope. In certain embodiments, the screen of the computing device may display instructions providing guidance to a user for placing the object 504. In one embodiment, the object is placed underneath the computing device 104, such that the most distal end of the computing device (from the angle of elevation) rests on top of the object. In one or more embodiments, the system may determine the measure of the angle of elevation (e.g., Angle 'A' as shown in FIG. 5) of the computing device resulting from the object 504 being placed on a flat surface 502 underneath the computing device 104. In at least one embodiment, the system may calculate an attribute (e.g., Height 'a' as shown in FIG. 5) of the object by using the known and/or derived measurements (e.g., measure of the angle of elevation of the computing device, distance from the vertex of the angle of elevation to the object 504, etc.) in a mathematical equation (e.g., the Pythagorean Theorem). In at least one embodiment, the object 504 may be a human finger, whereby the attribute calculated may be used to generate the ring size of the finger as described above in relation to FIG. 2. In another embodiment, the object may be a ring, a card, a toy, or any other suitable object.

Figure 6:
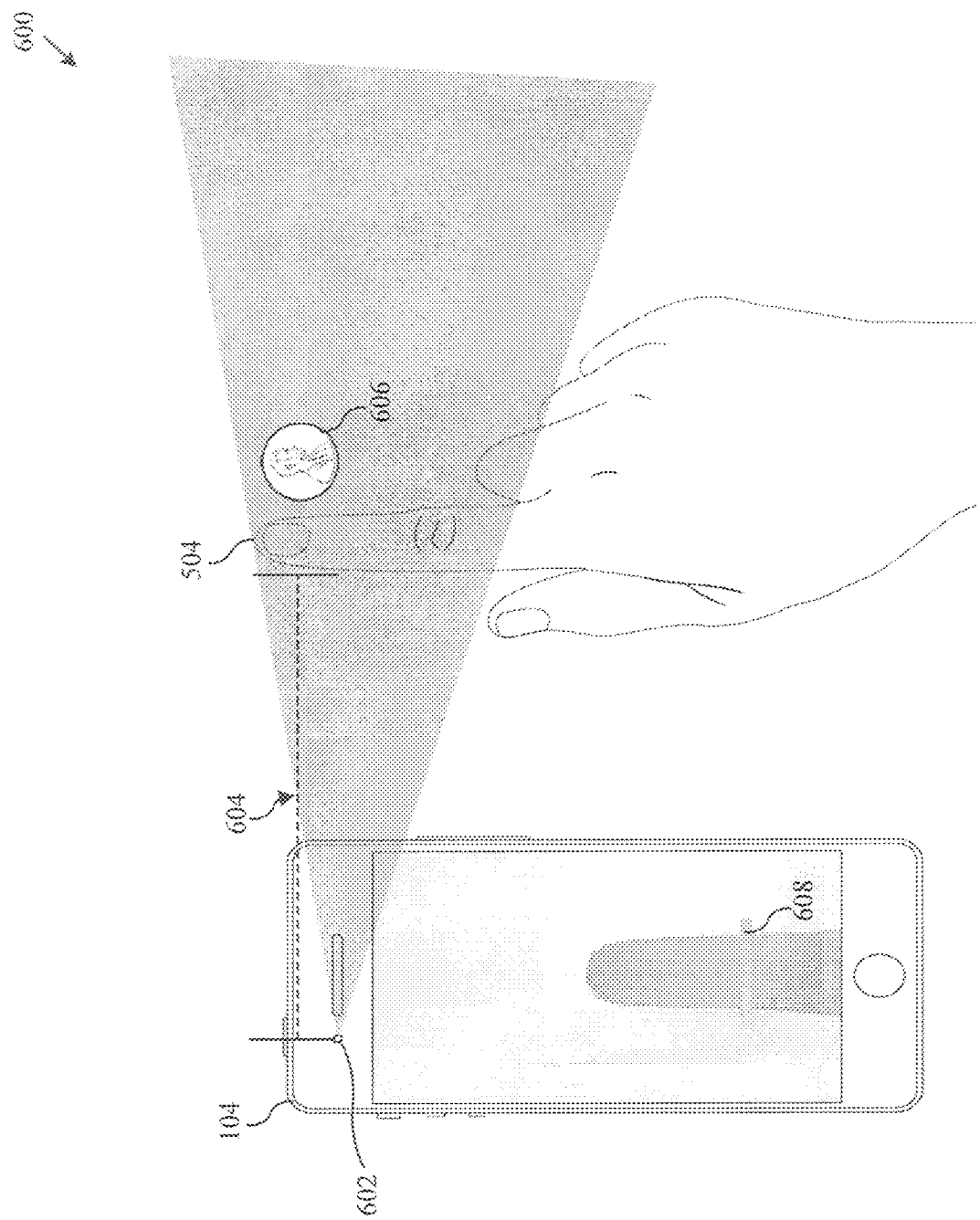
FIG. 6 illustrates an exemplary use care scenario, according to one embodiment of the present disclosure.

Referring now to FIGS. 6 and 7, an exemplary object (e.g., finger) sizing use case 600 is shown, according to one embodiment of the present disclosure. In at least one embodiment, and as shown in FIGS. 6 and 7, the camera 602 of a computing device 104 may be used to facilitate object measurement. In various embodiments, the object 504 (e.g., finger) to be measured is placed in front of the camera and an image of the object is captured. In one or more embodiments, the camera 602 may detect various properties of the object, including but not limited to, the distance 604 from the camera to the object 504. In particular embodiments, the distance from the camera to the object may be generated by placing the object 504 to be measured in close proximity to a reference object 606 (e.g., a penny). In these embodiments (and others), the system may determine the distance of the object to be measured by recognizing the reference object 606 and its known width (or height) and multiplying that known width (or height) by the focal length 702 of the camera (a known value of the computing device's camera). In at least one embodiment, the product of the distance from the camera 602 to the object 504, the pixel width of the object in the image, and the width (or height) of the camera's sensor (a known value of the computing device's camera) is calculated. In these embodiments, an attribute (e.g., the width) of the object 504 (e.g., finger) to be measured is generated by dividing this product by the product of the focal length 702 of the camera 602 (a known value of the computing device's camera) and the total pixel width (or height) of the image of the object captured by the camera. In one embodiment, the pixel width of the object 504 may be calculated by measuring a predetermined position on the object. In these embodiments (and others), the predetermined position of the object may be based on the object's positioning in front of the camera (e.g., position 608). In particular embodiments, the predetermined position of the object 504 may be based on the object's relative position to a reference object 606. In one or more embodiments, the pixel width of the object may be calculated in any suitable manner (e.g., the pixel width at multiple locations on the object may be measured and averaged, etc.). In at least one embodiment, and as shown in FIG. 6, the object 504 may be a human finger, whereby the attribute calculated may be used to generate the ring size of the finger as described above in relation to FIG. 2.

As another example of an alternative embodiment, a projection mechanism may be used to facilitate object measurement. In one or more embodiments, a computing device may be operable to project two lines (or a silhouette of an object) onto a wall or other flat surface, whereby the object to be measured may be positioned between the two projected lines. In various embodiments, the distance between the two projected lines may initially appear with a predetermined pixel width (e.g., 100 pixels, 150 pixels, 250 pixels, etc.). In particular embodiments, the two projected lines may be resized such that the object to be measured is positioned between, and tangential to, the two projected lines. In some embodiments, the resulting pixel width (i.e., pixel dimension) between the two projected lines is determined by the resultant offset of pixels upon resizing the two projected lines (e.g., if the initial predetermined pixel width is 100 pixels and the two projected lines are broadened by 20 pixels and then subsequently narrowed by 10 pixels, then the resulting pixel width would be 110 pixels). In at least one embodiment, an attribute (e.g., the width) of the object to be measured is generated by dividing the resulting pixel width between the two projected lines by pixel ratio, i.e., the number of pixels per inch ("ppi") of the projected image (a known specification of the projection mechanism).

Furthermore, alternative embodiments may include three-dimensional rendering to facilitate object measurement. In various embodiments, a computing device may include sensors to scan the object (e.g., finger) such that a three-dimensional map of the object may be created. In particular embodiments, the sensors used by the computing device may include depth sensors, sonic sensors, dual cameras, infrared, or any other suitable sensors. In certain embodiments, the object may be held at a particular distance (e.g., six inches, one foot, three feet, etc.) from the sensor. In one or more embodiments, the sensor may measure the environment in front of the computing device, such that spatial reference points may be generated. In a particular embodiment, the object is aligned with each axis of the sensor (e.g., camera). In at least one embodiment, the sensor counts the number of pixels contained in the width of the object (e.g., finger) and measures the distance to each pixel on each axis. In various embodiments, the product of the distance from the sensor to the object, the pixel width of the object in the three-dimensional rendering, and the width (or height) of the sensor (a known value of the sensor) is calculated. In these embodiments, the width of the object (e.g., finger) to be measured is generated by dividing this product by the product of the focal length of the sensor (a known value of the sensor) and the total pixel width (or height) of the three-dimensional rendering.

In yet another example of an alternative embodiment, heat sensing technology may be used to facilitate object measurement. In particular embodiments, a user may place his or her finger (or other object) on the screen of a computing device operable to detect heat. In various embodiments, the heat generated by the user's finger would create an imprint of the user's finger on the screen. In at least one embodiment, the pixel width (i.e., pixel dimension) of the imprint of the user's finger is determined by a pixel counter or other suitable mechanism. In one or more embodiments, the width of the user's finger (or other object) is determined by dividing the pixel width of the imprint of the user's finger by the number of pixels per inch of the computing device's screen (a known specification of the computing device).

Additionally, light sensing technology may be used for object measurement. In particular embodiments, a user's finger (or other object) may be placed on the screen of a computing device operable to detect light. In various embodiments, upon shining a light onto the screen containing the user's finger, the system detects the absence of light on the screen where the user's finger is resting. In one or more embodiments, the width of the area containing the absence of light may be measured to determine the width of the user's finger. In certain embodiments, the pixel width (i.e., pixel dimension) of the area containing the absence of light is determined by a pixel counter or other suitable mechanism. In at least one embodiment, the width of the user's finger (or other object) is determined by dividing the pixel width of the area containing the absence of light by the number of pixels per inch of the computing device's screen (a known specification of the computing device).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method for automatically sizing a human appendage via an electronic computing device, comprising the steps of:
    displaying a silhouette of an anticipated human appendage on a graphical user interface (GUI) of the electronic computing device, wherein the GUI is configured to operate in close physical proximity to the human appendage;
    receiving input at the electronic computing device corresponding to the silhouette, wherein the input results in a display of an updated silhouette of the anticipated human appendage such that the updated silhouette displayed on the GUI substantially matches the size and shape of the human appendage, the updated silhouette having a pixel dimension;
    retrieving a pixel ratio corresponding to the GUI of the electronic computing device, wherein the pixel ratio comprises the number of pixels per unit of measure of the GUI; and
    calculating an attribute of the human appendage based on the pixel dimension and the pixel ratio.

2. The method of claim 1, wherein the input comprises user interaction with the GUI to increase or decrease the size of the silhouette.

3. The method of claim 1, wherein the input comprises instructions to modify a size or shape of the silhouette.

4. The method of claim 1, wherein the input comprises voice commands or gestures.

5. The method of claim 1, wherein the unit of measure is an inch and the pixel ratio comprises the number of pixels per inch of the GUI.

6. The method of claim 1, wherein the attribute comprises a diameter of the human appendage.

7. The method of claim 1, wherein the human appendage comprises a human finger.

8. The method of claim 7, wherein the attribute comprises a width of the human finger.

9. The method of claim 8, further comprising the step of determining a ring size of the human finger by comparing the width of the human finger to a known table of ring sizes affiliated with diameter ranges.

10. The method of claim 9, further comprising the steps of:
    initiating a connection to an e-commerce platform;
    transmitting the ring size via the connection to the e-commerce platform; and
    initiating an order of a ring based on the ring size.

11. A system for automatically sizing a human appendage, comprising:
    a database that stores pixel ratios for electronic computing devices; and
    an electronic computing device in operative communication with the database, the electronic computing device having a processor operative to:
        display a silhouette of an anticipated human appendage on a graphical user interface (GUI) of the electronic computing device, the GUI configured to operate in close physical proximity to the human appendage;
        receive input at the electronic computing device corresponding to the silhouette, wherein the input results in a display of an updated silhouette of the anticipated human appendage such that the updated silhouette displayed on the GUI substantially matches the size and shape of the human appendage, the updated silhouette having a pixel dimension;
        retrieve a pixel ratio corresponding to the GUI of the electronic computing device from the database, wherein the pixel ratio comprises the number of pixels per unit of measure of the GUI; and
        calculate an attribute of the human appendage based on the pixel dimension and the pixel ratio.

12. The system of claim 11, wherein the input comprises user interaction with the GUI to increase or decrease the size of the silhouette.

13. The system of claim 11, wherein the input comprises instructions to modify a size or shape of the silhouette.

14. The system of claim 11, wherein the input comprises voice commands or gestures.

15. The system of claim 11, wherein the unit of measure is an inch and the pixel ratio comprises the number of pixels per inch of the GUI.

16. The system of claim 11, wherein the attribute comprises a diameter of the human appendage.

17. The system of claim 11, wherein the human appendage comprises a human finger.

18. The system of claim 17, wherein the attribute comprises a width of the human finger.

19. The system of claim 18, wherein the processor is further operative to determine a ring size of the human finger by comparing the width of the human finger to a known table of ring sizes affiliated with diameter ranges.

20. The system of claim 19, wherein the processor is further operative to:
    initiate a connection to an e-commerce platform;
    transmit the ring size via the connection to the e-commerce platform; and
    initiate an order of a ring based on the ring size.

21. A mobile device for automatically sizing a human appendage, comprising:
    a processor operable on the mobile device, the processor operative to:
        display a silhouette of an anticipated human appendage on a graphical user interface (GUI) of the mobile device, the GUI configured to operate in close physical proximity to the human appendage;
        receive input at the mobile device corresponding to the silhouette, wherein the input results in a display of an updated silhouette of the anticipated human appendage such that the updated silhouette displayed on the GUI substantially matches the size and shape of the human appendage, the updated silhouette having a pixel dimension;
retrieve a pixel ratio corresponding to the GUI of the mobile device, wherein the pixel ratio comprises the number of pixels per unit of measure of the GUI; and
calculate an attribute of the human appendage based on the pixel dimension and the pixel ratio.

\* \* \* \* \*